Feb. 20, 1934. J. D. BERWICK 1,948,327
MAT
Filed Dec. 19, 1930

Inventor
Jo D. Berwick

By Bee+Bush
Attorneys

Patented Feb. 20, 1934

1,948,327

UNITED STATES PATENT OFFICE 1,948,327

MAT

Jo D. Berwick, Akron, Ohio, assignor to Wingfoot Corporation, Wilmington, Del., a corporation of Delaware Application December 19, 1930
Serial No. 503,436

3 Claims. (Cl. 154—49)

This invention relates to mats and it has particular relation to a mat adapted to be employed as a floor covering for motor vehicles.

One object of the invention is to provide a mat composed entirely of a homogeneous material, such as rubber, which has a contour of such nature that the mat has cushioning properties.

Another object of the invention is to provide a mat which freely permits circulation of air between its lower surface and the floor upon which it is disposed.

Another object of the invention is to provide a mat so constructed that it serves as an effective insulator of heat and noises developing below the floor of the vehicle.

Heretofore, floor mats for motor vehicles have been constructed of a layer of rubber having a layer of felt or similar fabric material cemented to its lower surface. In manufacturing such a mat it was necessary first to vulcanize the rubber, then to apply cement to the fabric, and finally to stitch the fabric to the rubber. Also, it was necessary to cut the fabric and rubber to desired size prior to assembling them. Hence, considerable expense was involved in manufacturing mats of this character because of the different materials utilized, and the various operations required. Moreover, it was observed that the fabric on the lower side of the rubber absorbed moisture readily, particularly when the mat was removed and cleaned with water. If the mat were not thoroughly dried before replacing it in the motor vehicle, the moisture remaining in the fabric did not evaporate readily because air could not circulate very well between the floor of the vehicle and the fabric.

The invention resides in providing a mat of homogeneous material, particularly rubber, thereby obviating the fabric base used in prior constructions. In order to secure a cushioning effect in the mat, its lower surface is provided with suitable ribs or projections which are resilient to pressure exerted upon the upper surface of the mat. The construction of the ribs or projections is such that air freely may circulate between the lower surface of the mat and the floor of the motor vehicle, thereby permitting any moisture on the floor of the vehicle or on the lower surface of the mat to evaporate rapidly. Also, the invention contemplates the provision of a heat and noise insulating element which is embodied in the mat. This element may comprise felt or similar material, and is not exposed either to the upper surface of the mat or to its lower surface.

For a better understanding of the invention, reference may now be had to the accompanying drawing, forming part of this specification in which.

Figure 1:
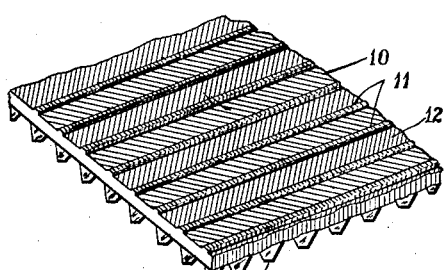
Fig. 1 is a fragmentary perspective view of a mat constructed according to one form of the invention.
Figure 2:
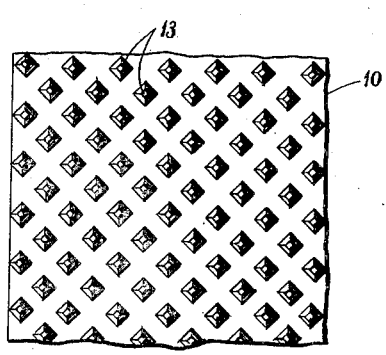
Fig. 2 is a view of the lower side of the mat shown by Fig. 1.

Referring to Fig. 1, a mat 10 is provided which comprises a layer of rubber having spaced parallel ribs 11 on its upper surface. Smaller diagonally disposed ribs 12 extend between the ribs 11 to provide a roughened surface which in conjunction with the ribs 11, prevents users of the mat from slipping when treading upon it. As best shown by Fig. 2, the lower side of the mat is provided with frusto-pyramidal projections 13 which serve as cushioning elements. These elements are arranged in parallel lines, which, as best shown by Fig. 1, extend obliquely to the ribs 11 on the upper surface of the mat. When a user of the mat treads upon its upper surface, the ribs 11 first are engaged, and a depression of the parts of the mat beneath the ribs first occurs. By arranging the pyramidal projections 13 in lines obliquely to the ribs 11, spaced cushioning elements are provided beneath the ribs as well as between them, without requiring the use of a large number of projections. It is desirable to have a small number of projections of relatively smaller size in order to secure maximum efficiency in cushioning effects. By arranging the projections 13 in the manner described, proper cushioning effects may be secured, while at the same time the ribs 11 on the upper surface of the mat will be properly supported.

Figure 3:
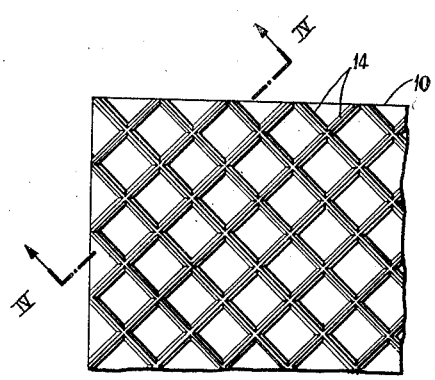
Fig. 3 is a view of the lower side of a mat similar to that shown by Fig. 1, which has a heat and noise insulating element disposed between the upper and lower surfaces thereof.

According to Fig. 3, a mat is provided having an upper surface identical to that shown by Fig. 1, and a lower surface having criss-crossing ribs 14. The ribs 14 also extend obliquely to the ribs 11 on the upper surface of the mat, in order to secure proper support for the ribs last mentioned.

Figure 4:
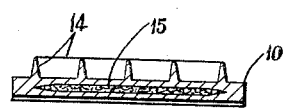
Fig. 4 is a cross-sectional view taken substantially along the line IV—IV of Fig. 3.

Each of the ribs 14 is of wedge-shape in cross-section thereby presenting a small area of floor contacting surface on the lower side of the mat. As best shown by Fig. 4, a layer 15 of heat and noise insulating material such as felt or paper material, is embedded in the rubber between the upper and lower surfaces of the mat, thereby dissipating much of the heat and noise ordinarily noticeable in the interior of a motor vehicle.

Figure 5:
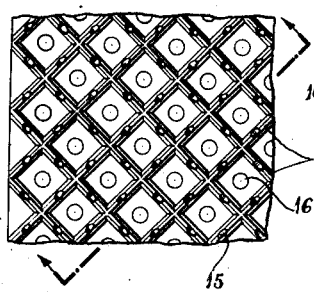
Fig. 5 is a fragmentary view of a mat similar to that shown by Fig. 1, showing the lower surface of the mat provided with a different arrangement of cushioning elements.
Figure 6:
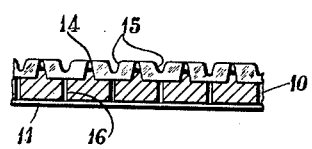
Fig. 6 is a cross-sectional view taken substantially along the line VI—VI of Fig. 5.

Fig. 5 discloses a construction similar to that shown by Fig. 3 in which the ribs 14 are provided with notches 15 to avoid air pockets between crossing ribs. Also, openings 16 which extend entirely through the mat, may be provided to prevent the entrapment of air in such pockets. It is evident that either the openings 16 or the notches 15 may be dispensed with if this is found desirable. Whether or not a construction such as that shown by Fig. 5 or a construction such as that shown by Fig. 3 is employed, depends upon the desirability of securing free circulation of air between the lower surface of the mat and the floor of the vehicle. It should be understood that the heat insulating element 15, may or may not be utilized in any of the constructions shown by the drawing, depending upon whether or not it is desired to insulate the mat in the manner described.

Floor mats constructed according to the invention are relatively inexpensive as compared to mats manufactured according to previous practice, because it is less expensive to manufacture a floor mat entirely of rubber than it is to manufacture it of rubber and fabric, and subsequently cementing these elements together. While it is more expensive to embed a heat and noise insulating element in the floor mat as shown by Fig. 4, this does not effect the waterproof character of the mat. Even if the heat insulating element is used, the mats may be cleansed with water and quickly dried, and even if disposed on the floor of a motor vehicle while wet they will quickly dry because of the free circulation of air between the lower surface of the mat and the floor of the vehicle.

Although only the preferred form of the invention has been described and shown in detail, it will be apparent to those skilled in the art that the invention is not so limited but that various minor modifications may be made therein, without departing from the spirit of the invention or from the scope of the appended claims.

What I claim is:

1. A mat for floors, comprising a body having elastic properties, said body being of substantially uniform thickness, ribs on the lower side of the body arranged in criss-crossing relation, each rib being wedge shaped in cross-section with its smallest edge outermost with respect to the body of the mat, said body being composed of rubber having a layer of sound insulating material completely embedded between its upper and lower surfaces, and ribs on the upper surface of said body extending at angles to the ribs on the lower side of the body.

2. A mat for floors comprising a rubber body having a layer of sound insulating material completely embedded between its upper and lower surfaces, said body being of sufficient thickness to provide a considerable thickness of material between the insulating material and the upper and lower surfaces of the body, and rubber cushioning elements projecting from the lower side of the body and integral rubber ribs on the upper side of the body.

3. A mat for floors comprising a flexible body having a plurality of individual air pockets in its lower surface, and small openings in the body adjacent each pocket communicating each pocket individually with the atmosphere whereby air will not be completely trapped in the pockets.

JO D. BERWICK.